US012762452B2

(12) United States Patent
Guha et al.

(10) Patent No.: US 12,762,452 B2
(45) Date of Patent: Oct. 13, 2026

(54) CLUSTER-STATE QUANTUM COMPUTING METHODS AND SYSTEMS

(71) Applicant: Arizona Board of Regents on Behalf of the University of Arizona, Tucson, AZ (US)

(72) Inventors: Saikat Guha, Tucson, AZ (US); Christos Gagatsos, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 1348 days.

(21) Appl. No.: 17/594,874

(22) PCT Filed: May 2, 2020

(86) PCT No.: PCT/US2020/031220
§ 371 (c)(1),
(2) Date: Nov. 2, 2021

(87) PCT Pub. No.: WO2020/223718
PCT Pub. Date: Nov. 5, 2020

(65) Prior Publication Data

US 2022/0215069 A1 Jul. 7, 2022

Related U.S. Application Data

(60) Provisional application No. 62/842,478, filed on May 2, 2019.

(51) Int. Cl.

| | |
|---|---|
| ***G06N 10/40*** | (2022.01) |
| ***G06F 17/14*** | (2006.01) |
| ***G06N 10/60*** | (2022.01) |

(52) U.S. Cl.
CPC ............. *G06N 10/60* (2022.01); *G06F 17/14* (2013.01); *G06N 10/40* (2022.01)

(58) Field of Classification Search
CPC ......... G06N 10/60; G06N 10/40; G06F 17/14
See application file for complete search history.

(56) References Cited

U.S. PATENT DOCUMENTS 9,264,225 B1 * 2/2016 Hunt ..................... H04L 9/0852
9,354,039 B2 * 5/2016 Mower .................. B82Y 20/00
(Continued)

OTHER PUBLICATIONS

Photon subtractor for spectrally multimode quantum state (Year: 2017).*
(Continued)

*Primary Examiner* — Hien L Duong
(74) *Attorney, Agent, or Firm* — Cozen O'Connor

(57) ABSTRACT

A method for cluster-state quantum computing method includes transforming a Gaussian graph state into a non-Gaussian percolated graph state by probabilistically subtracting one photon from each of a plurality of modes forming the Gaussian graph state. The method also includes determining cat-basis qubits of the non-Gaussian percolated graph state for which one photon was successfully subtracted from a corresponding one of the modes, and identifying in the non-Gaussian percolated graph state a renormalized graph of logical qubits connected by percolation highways. The logical qubits and percolation highways are formed from the cat-basis qubits. The renormalized graph and the non-Gaussian percolated graph state are outputted to a one-way quantum computer to implementing a quantum computing algorithm.

20 Claims, 6 Drawing Sheets

(56) References Cited

U.S. PATENT DOCUMENTS

| | | | | |
|---|---|---|---|---|
| 9,858,531 | B1 * | 1/2018 | Monroe | G06N 10/40 |
| 11,126,062 | B1 * | 9/2021 | Kieling | G02F 1/3501 |
| 11,501,198 | B1 * | 11/2022 | Birchall | G06N 10/40 |
| 11,558,069 | B1 * | 1/2023 | Sparrow | G06N 10/40 |
| 2008/0035911 | A1 * | 2/2008 | Gilbert | G06N 10/20 257/14 |
| 2014/0124739 | A1 * | 5/2014 | Deaton | G06N 10/40 257/31 |
| 2017/0357539 | A1 * | 12/2017 | Dadashikelayeh | G06F 9/5044 |
| 2018/0081255 | A1 * | 3/2018 | Reimer | G02F 1/365 |
| 2018/0114138 | A1 | 4/2018 | Monroe et al. | |
| 2018/0341874 | A1 * | 11/2018 | Puri | G06N 10/40 |

OTHER PUBLICATIONS

PCT Application No. PCT/US20/31220, International Search Report and Written Opinion, dated Jul. 21, 2020, 10 pages.

Gimeno-Segovia, et al., "From Three-Photon Greenberger-Horne-Zeilinger States to Ballistic Universal Quantum Computation", Physical Review Letters, American Physical Society, PRL 115, 020502 (2015), week ending Jul. 10, 2015, 10 pages.

* cited by examiner

CLUSTER-STATE QUANTUM COMPUTING METHODS AND SYSTEMS

RELATED APPLICATIONS

This application claims priority to U.S. provisional patent application No. 62/842,478, filed May 2, 2019 and titled "Continuous-Variable Quantum Computing with Photonic Cluster States", the entirety of which is incorporated herein by reference.

GOVERNMENT RIGHTS

This invention was made with government support under Grant No. W911NF-18-1-0377, awarded by ARMY/ARO. The government has certain rights in the invention.

BACKGROUND

In measurement-based quantum computing, a quantum algorithm is implemented by performing a sequence of single-node measurements on a cluster state of qubits arranged in a square-grid topology. Gaussian cluster states may be prepared using squeezed vacuum states and linear optics, both of which are physically realizable using techniques known in the art. Although large entangled Gaussian state clusters have been experimentally demonstrated, no-go theorems show that Gaussian states alone cannot be used for universal quantum computing. To achieve universality, at least one non-Gaussian resource is required to complete the "toolkit".

Examples of non-Gaussian resources that have been proposed for universal quantum computing include Gottesman-Kitaev-Preskill (GKP) states, cat states, photon number detection, and single-photon states. Although these proposed resources are mathematically elegant, many are impractical to physically implement. For example, in the Knill-Laflamme-Millburn model of quantum computing, the non-Gaussian resource is introduced by a nonlinear phase flip (i.e., a cubic phase gate). However, it is unknown how to implement such a nonlinear phase flip. In continuous variable quantum computing, the GKP model proposes the creation of a resource cluster state using momentum eigenstates and controlled-Z gates. However, momentum eigenstates correspond to nonphysical infinitely-squeezed states, and it is not known how to physically implement such states with finite squeezing.

SUMMARY OF THE EMBODIMENTS

The present embodiments include a hybrid architecture that combines continuous variable (CV) and discrete variable (DV) techniques to advantageously implement scalable, universal, CV photonic quantum computing using the currently available technologies of squeezed photon sources, photon-number-resolving detectors, and linear optics. Embodiments herein use quantum bits, or qubits, as opposed to quantum modes, or qumodes. However, these qubits are encoded in CV "cat-like" states that approximate true Schrödinger cat states. Qubits in cat-like states may form an entangled cluster state that can be advantageously used for fault-tolerant universal quantum computing without complex nonlinear phase gates.

The largest entangled states that have been experimentally generated with individually-addressable quantum systems are multimode squeezed states with thousands of entangled optical modes that are simultaneously available. The present embodiments may be scaled to operate with such large entangled states, and may be further combined with one-way quantum computation techniques to implement a photonic quantum computer that meets DiVincenzo criteria.

In embodiments, a cluster-state quantum computing method includes transforming a Gaussian graph state into a non-Gaussian percolated graph state by probabilistically subtracting one photon from each of a plurality of modes forming the Gaussian graph state. The method also includes determining cat-basis qubits of the non-Gaussian percolated graph state for which one photon was successfully subtracted from a corresponding one of the modes, and identifying in the non-Gaussian percolated graph state a renormalized graph of logical qubits connected by percolation highways. The logical qubits and percolation highways are formed from the cat-basis qubits. The method also includes outputting the renormalized graph and the non-Gaussian percolated graph state to a one-way quantum computer.

In embodiments, a cluster-state quantum computing system includes an array of photon subtractors configured to transform a Gaussian graph state into a non-Gaussian percolated graph state by probabilistically subtracting one photon from each of a corresponding plurality of modes forming the Gaussian graph state. Each of the photon subtractors includes a single-photon detector configured to output a detector signal. The system also includes a renormalizer configured to process the detector signal outputted by each single-photon detector to determine cat-basis qubits of the non-Gaussian percolated graph state for which one photon was successfully subtracted from a corresponding one of the modes. The renormalizer is also configured to identify in the non-Gaussian percolated graph state a renormalized graph of logical qubits connected by percolation highways, wherein the logical qubits and percolation highways are formed from the cat-basis qubits. The renormalizer is also configured to output the renormalized graph and the non-Gaussian percolated graph state to a one-way quantum computer.

DETAILED DESCRIPTION OF THE EMBODIMENTS

Figure 1:
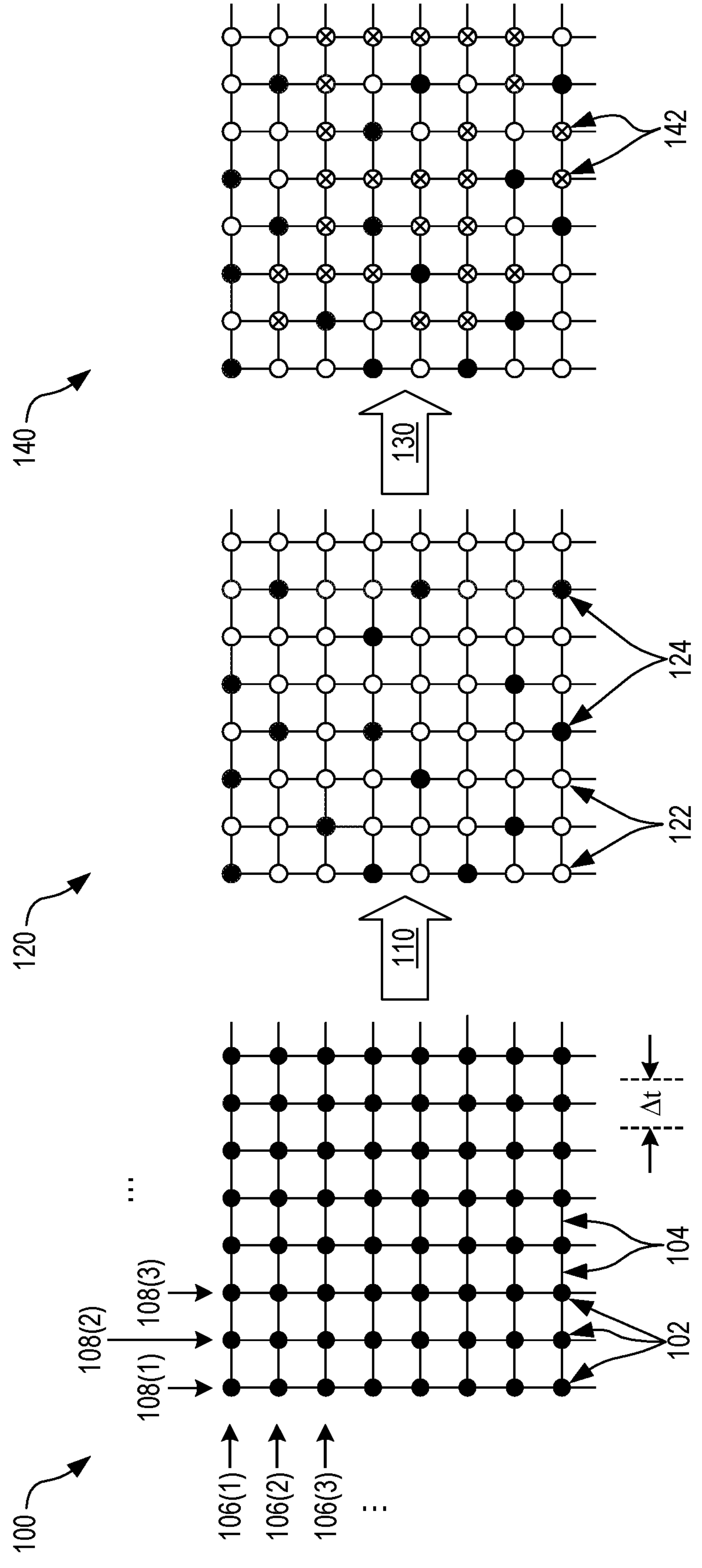
FIG. 1 shows transformation of a Gaussian graph state into a renormalized cluster state that can be subsequently used as a quantum resource for universal quantum computation, in embodiments.

FIG. 1 shows transformation of a Gaussian graph state 100 into a renormalized cluster state 140 that can be subsequently used as a quantum resource for universal quantum computation. The Gaussian graph state 100 is a squeezed state containing a plurality of entangled modes 102. The Gaussian graph state 100 is depicted in FIG. 1 as a two-dimensional mathematical graph with nodes representing modes 102 and edges, or links, representing pairwise entanglement 104 between neighboring modes 102. Thus, each of the modes 102 is entangled with its nearest-neighbor modes 102. For example, each mode 102 away from the periphery of the Gaussian graph state 100 has four nearest-neighbor modes 102. Each of the modes 102 is orthogonal to all of the other modes 102, and may be a classical mode or a quantum mode. In embodiments, the modes 102 are quantum electromagnetic modes arising from quantization of the electromagnetic field, and may correspond to spatial modes, temporal modes, polarization modes, frequency modes, or a combination thereof.

While FIG. 1 shows the Gaussian graph state 100 represented as a square lattice having eight rows 106 and eight columns 108, the Gaussian graph state 100 may have any number $N_R>1$ of rows 106 and any number $N_C>1$ of columns 108 without departing from the scope hereof. In other embodiments, the Gaussian graph state 100 forms an n-dimensional graph, where n>2. For example, the Gaussian graph state 100 may form a three-dimensional cubic lattice, wherein each of the modes 102 away from the periphery is entangled with six nearest-neighbor modes 102.

The Gaussian graph state 100 is converted into a non-Gaussian percolated graph state 120 via photon subtraction 110 of modes 102. Photon subtraction 110 probabilistically transforms the modes 102 into cat-basis qubits 122 that collectively form a multimode cat-basis entangled state $|\psi_\pm\rangle$. The cat-basis entangled state $|\Psi_\pm\rangle$ approximates a true multimode Greenberger-Horne-Zeilinger (GHZ) cat state $|C_+\rangle$ of the form $$|C_\pm\rangle = \frac{1}{N_\pm}(|\alpha, \alpha, \alpha, \ldots, \alpha\rangle \pm |-\alpha, -\alpha, -\alpha, \ldots, -\alpha\rangle), \quad (1)$$

where $N_\pm$ is a normalization constant and each mode of $|C_+\rangle$ is a coherent state with complex amplitude a. The number of amplitudes $\alpha$ in each ket in the right side of Eqn. 1 equals the number of modes 102 forming the Gaussian graph state 100. When $|\alpha|$ is small, $|\Psi_\pm\rangle \neq |C_\pm\rangle$, and thus $|\Psi_\pm\rangle$ may be used in place of $|C_\pm\rangle$ to perform universal quantum computation.

One aspect of the embodiments is the realization that a non-Gaussian N-mode cat-basis entangled state $|\Psi_\pm\rangle$ can be formed from the N-mode Gaussian graph state 100 by directly subtracting one photon from each of the N modes 102. The present embodiment may advantageously achieve a higher success probability (i.e., a higher probability that one photon was successfully subtracted from each of the N modes 102), and a higher fidelity, as compared to the technique of subtracting N photons from a single-mode squeezed state to create a single-mode cat-basis state, and subsequently converting the single-mode cat-basis state into the N-mode cat-basis entangled state $|\Psi_\pm\rangle$ via coupling with the vacuum state in a plurality of beamsplitters.

In FIG. 1, empty circles of the percolated graph state 120 represent cat-basis qubits 122, i.e., modes 102 that were successfully transformed into a cat-basis state due to photon subtraction 110 (i.e., one photon was subtracted from the corresponding mode 102). Solid circles of the percolated graph state 120 are untransformed modes 124 for which no photons were detected. The untransformed modes 124 are therefore the same as the modes 102.

Renormalization 130 identifies in the percolated graph state 120 a plurality of cat-like connected qubits 142 that form a renormalized graph state 140. Thus, the renormalized graph state 140 is a substrate of the percolated graph state 120 wherein each of connected qubits 142 is one of the cat-basis qubits 122. Renormalization 130 generates a renormalized graph (see the renormalized graphs 200 and 300 of FIGS. 2 and 3, respectively) that corresponds to the percolated graph state 120 but identifies connected qubits 142 forming the renormalized graph state 140. As described in more detail below, renormalization 130 identifies the connected qubits 142 by finding within the percolated graph state 120 a plurality of "percolation highways", i.e., long-range, crossing, edge-disjoint, one-dimensional chains of connected qubits 142 (see percolation highways 202, 204 in FIGS. 2 and 3).

Figure 2:
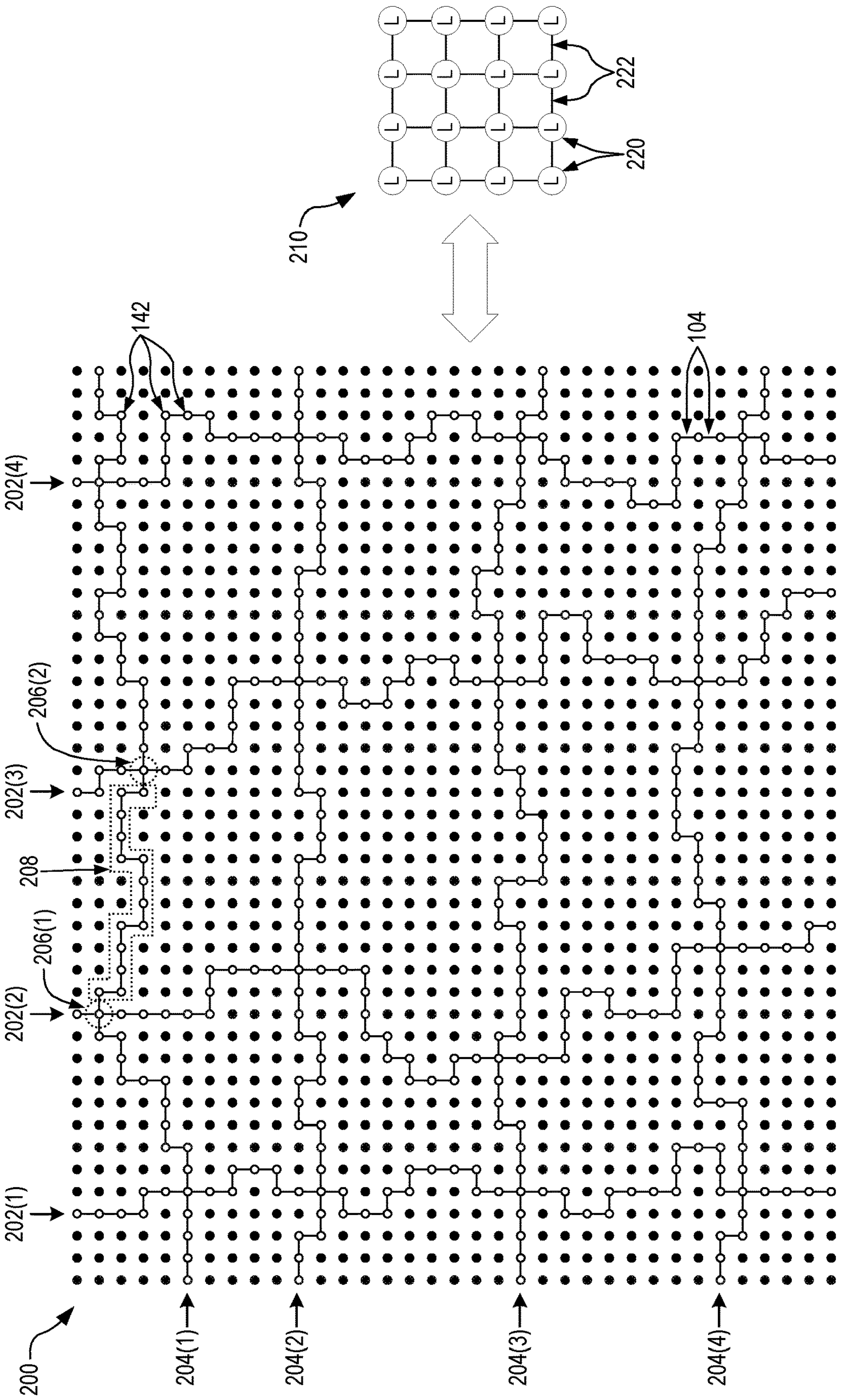
FIG. 2 shows a renormalized graph identifying connected qubits that form vertical percolation highways, horizontal percolation highways, and crossover qubits, in embodiments.

FIG. 2 shows a renormalized graph 200 identifying connected qubits 142 that form vertical percolation highways 202, horizontal percolation highways 204, and crossover qubits 206. The connected qubits 142 are shown in FIG. 2 as white circles, while all other modes/qubits are shown as black circles (i.e., untransformed modes 124 of the percolated graph state 120, and the cat-basis qubits 122 that are both excluded from the percolation highways 202, 204 and are not crossover qubits 206). For clarity, entanglement 104 is only shown in FIG. 2 between the connected qubits 142 forming the percolation highways 202, 204. While FIG. 2 shows the percolation highways 202, 204 fully extending across opposite sides of the renormalized graph 200, the percolation highways 202, 204 need not fully extend all the way to any side of the renormalized graph 200.

In FIG. 2, each cross-over qubit 206 is located where one of the vertical percolation highways 202 crosses one of the horizontal percolation highways 204. In the example of FIG. 2, four vertical percolation highways 202 cross four horizontal percolation highways 204 to generate sixteen cross-over qubits 206, of which only two are indicated for clarity. However, there may be a different number of vertical percolation highways 202 and/or horizontal percolation highways 204 in the renormalized graph 200.

The percolation highways 202, 204 may be represented as a two-dimensional logical lattice state 210 formed from logical qubits 220 connected to neighboring logical qubits 220 via logical entanglement 222. Each of the logical qubits 220 corresponds to one of the cross-over qubits 206, and each connection of logical entanglement 222 (i.e., each edge connecting two neighboring logical qubits 220) corresponds to one entanglement chain 208 of connected qubits 142 that joins a pair of neighboring cross-over qubits 206. In the example of FIG. 2, there are twenty-four entanglement chains 208, of which only one is indicated in the renormalized graph 200 for clarity.

After renormalization 130, a one-way quantum computer (see one-way quantum computer 440 in FIGS. 4 and 5) may use the renormalized graph state 140 by processing the percolated graph state 120 according to the renormalized graph 200. For example, where a node of the renormalized graph 200 indicates that a corresponding mode/qubit of the percolated graph state 120 is not a connected qubit 142 (i.e., a node with a black circle in FIG. 2), the quantum computer may perform a z-measurement on the mode/qubit to remove it from the percolated graph state 120, and to remove its entanglement to neighboring modes/qubits. Where a node of the renormalized graph 200 indicates that a corresponding connected qubit 142 belongs to an entanglement chain 208, the quantum computer may perform an x-measurement on the connected qubit 142 to remove it from the percolated graph state 120 while bridging the entanglement chain 208 (i.e., entangling the two nearest-neighbor connected qubits 142 that also belong to the entanglement chain 208). Where the node of the renormalized graph 200 indicates that a corresponding qubit is a cross-over qubit 206, the quantum computer may measure the cross-over qubit 206 according to a quantum algorithm.

Figure 3:
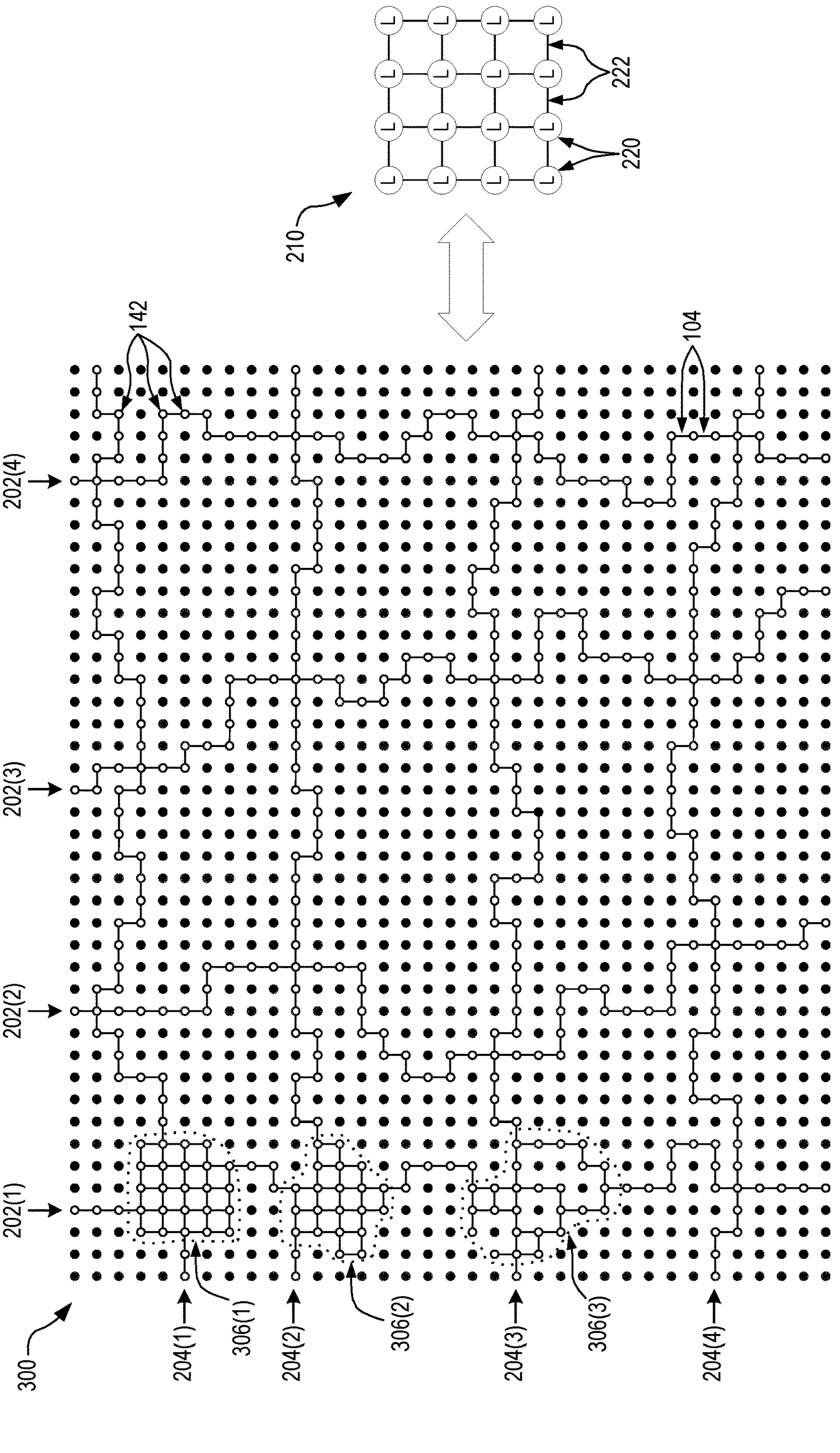
FIG. 3 is a renormalized graph similar to the renormalized graph of FIG. 2 except that each logical qubit of the logical lattice state corresponds to one of a plurality of cluster substrates, each formed from a group of connected cat-basis qubits, in embodiments.

FIG. 3 is a renormalized graph 300 similar to the renormalized graph 200 of FIG. 2 except that each logical qubit 220 of the logical lattice state 210 corresponds to one of a plurality of cluster substrates 306, each formed from a group of connected cat-basis qubits 142. That is, a single logical qubit 220 is represented by multiple physical qubits 142. Each cluster substrate 306 may be used to implement one logical qubit 220 with error correction to achieve fault-tolerant quantum computing. Examples of error-correction methods that may be used with cluster substrates 306 are known in the art. For clarity in FIG. 3, only three cluster substrates 306 are indicated. However, one cluster substrate 306 may be formed where one vertical percolation highway 202 crosses one horizontal percolation highway 204.

Figure 4:
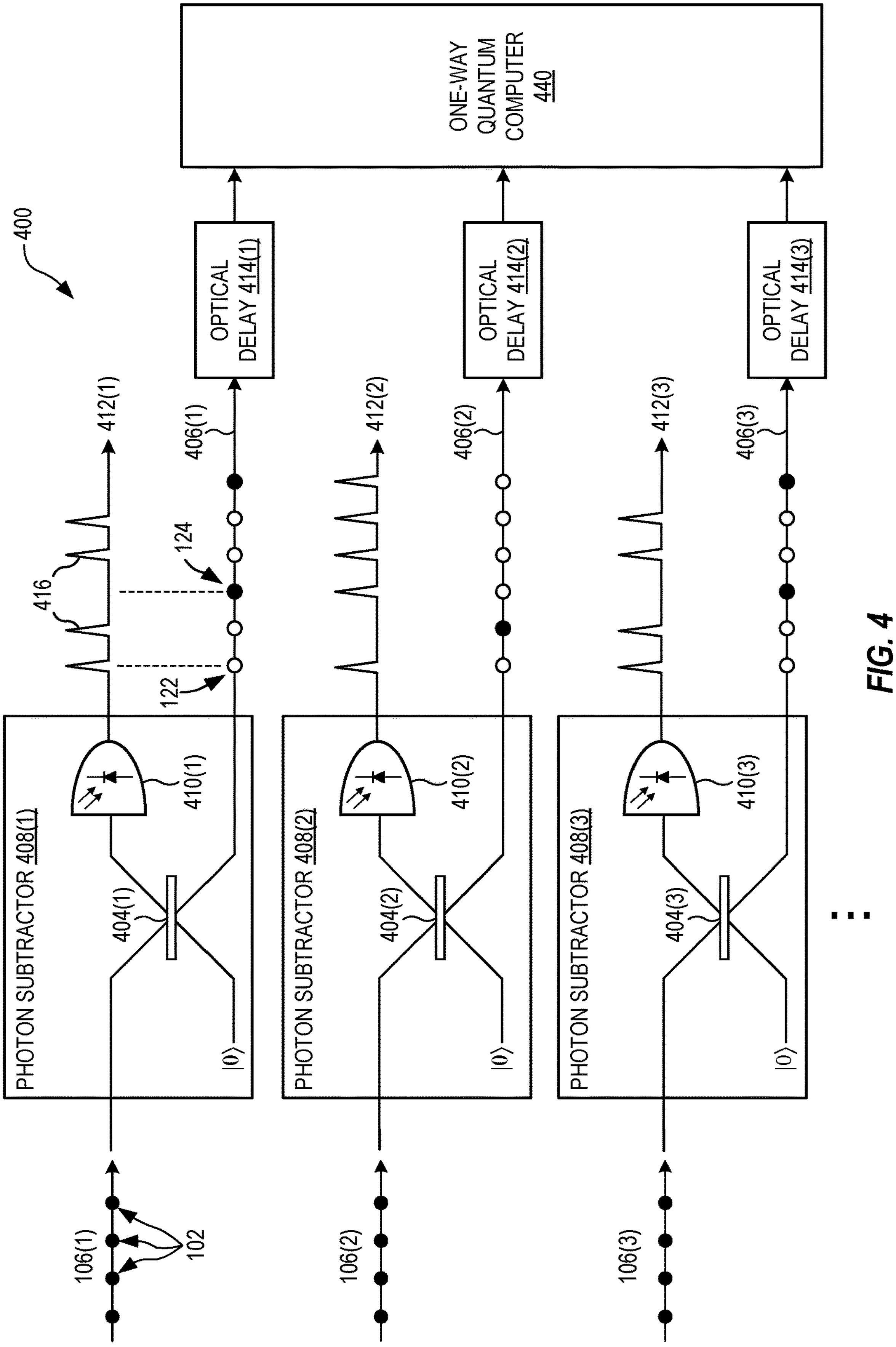
FIG. 4 is a functional diagram of a percolator that converts the Gaussian graph state into the non-Gaussian percolated graph state for subsequent processing by a one-way quantum computer, in an embodiment.

In the preceding discussion, the cat-basis qubits 122 and connected qubits 142 are represented in the cat basis. However, the present embodiments may be used with qubits in a GKP basis, or another type of hybrid CV non-Gaussian orthogonal qubit basis without departing from the scope hereof Physical Implementation FIG. 4 is a functional diagram of a percolator 400 that converts the Gaussian graph state 100 into the non-Gaussian percolated graph state 120 for subsequent processing by a one-way quantum computer 450. In FIG. 4, the Gaussian graph state 100 is physically implemented as a plurality of spatially-separated optical beams, each corresponding to one row 106 of the Gaussian graph state 100. The columns 108 of the Gaussian graph state 100 correspond to different times separated by a time interval Δt. Thus, the modes 102 are spatial-temporal modes, and the Gaussian graph state 100 is processed one column at a time over a duration of $N_C \times \Delta t$, where $N_C$ is the number of the columns 108. Although entanglement 104 between the rows 106 is not shown in FIG. 4 for clarity, it is implied that the modes 102 are entangled between the rows 106 according to the Gaussian graph state 100 of FIG. 1.

The percolator 400 includes an array of photon subtractors 408 that probabilistically transform each mode 102 into a cat-basis qubit 122 by subtracting one photon from said each mode 102. The percolator 400 also includes an array of optical delays 414 and an array of PNR photodetectors 410. There are N photon subtractors 408 and N optical delays 414, where N is the number of rows 106 (i.e., the number of spatially-separated optical beams being processed). Thus, each row 106 passes through a corresponding one of the photon subtractors 408 and one of the optical delays 414. With this architecture, the percolator 400 processes the N rows 106 in parallel.

In FIG. 4, a first photon subtractor 408(1) includes a first beamsplitter 404(1) with a high transmission (e.g., 98%) and a first PNR detector 410(1) coupled to a first output port of first beamsplitter 404(1). A first row 106(1) of the Gaussian graph state 100 is coupled to a first input port of the first beamsplitter 404(1), and the vacuum state 10) is coupled to a second input port of the first beamsplitter 404(1). The first PNR detector 410(1) outputs a first detector signal 412(1) in response to photons detected in the first output port. The cat-basis qubits 122 and untransformed modes 124 are outputted from a second output port of the first beamsplitter 404(1) as a first output stream 406(1) to form a corresponding row of the non-Gaussian percolated graph state 120. Although not shown in FIG. 4 for clarity, it is implied that the cat-basis qubits 122 and untransformed modes 124 of one output stream 406 are entangled with qubits/modes in neighboring output streams 406 according to the non-Gaussian percolated graph state 120 of FIG. 1.

The modes 102 of the first row 106(1) are sequentially inputted to the first photon subtractor 408(1). Transformation of each mode 102 into a cat-basis qubit 122 is conditioned upon detection of one photon by the first PNR detector 410(1), and thus is a probabilistic process. For example, FIG. 4 shows one cat-basis qubit 122 exiting the first photon subtractor 408(1). Simultaneously, the first detector signal 412(1) contains a peak 416 indicating that one photon was detected by the first PNR detector 410(1). In this case, the peak 416 indicates that a corresponding mode 102 of the first row 106(1) was successfully transformed into the cat-basis qubit 122.

FIG. 4 also shows one untransformed mode 124 exiting the first photon subtractor 408(1). Simultaneously, the first detector signal 412(1) contains no peak, i.e., no photons were detected by the first detector 410(1). This absence of a peak 416 indicates that a corresponding mode 102 of the first row 106(1) was not successfully transformed into a cat-basis qubit. Equivalently, the photon subtractor 408(1) subtracted zero photons from the corresponding mode 102, and thus remains in a Gaussian state.

The percolator 400 also includes a second photon subtractor 408(2) that operates similarly to the first photon subtractor 408(1). Specifically, the second photon subtractor 408(2) includes a second beamsplitter 404(2) and a second PNR detector 410(2) that cooperate to transform a second row 106(2) of the Gaussian graph state 100 into a second output stream 406(2) and a corresponding second detector signal 412(2). The percolator 400 may contain additional photon subtractors 408, as needed to process all of the rows 106 of the Gaussian graph state 100. Thus, while FIG. 4 shows the percolator 400 with three photon subtractors 408 processing three rows 106, the percolator 400 may include a different number of photon subtractors 408 without departing from the scope hereof.

The photon subtractors 408 transform each mode 102 into a cat-basis qubit 122 with a success probability p. When p is close to 1, almost every mode 102 is successfully transformed into the cat-basis qubit 122, in which case the percolated graph state 120 forms several percolation highways 202, 204, and a renormalized graph state 140 can be identified with high probability. However, when the probability p falls below a percolation threshold, there are too few cat-basis qubits 122 to form any percolation highways 202, 204, in which case the percolated graph state 120 contains insufficient non-Gaussian resources for universal quantum computing. The percolator 400 and/or Gaussian graph state 100 may be configured to ensure that p is greater than the percolation threshold. For example, squeezing of the Gaussian graph state 100 and/or reflectivity of the beamsplitters 404 may be selected to achieve a desired probability p.

The percolation threshold may be calculated for different types of cluster states. Embodiments herein implement site percolation by considering the untransformed modes 124 as having been "removed" from the Gaussian graph state 100. This contrasts with bond percolation, in which the edges (i.e., entanglement 104) between nodes (i.e., modes 102) are "removed". For the case of bond percolation, example values of the percolation threshold are known in the art.

The optical delays 414 delay the output streams 406 so that the photon subtractors 408 can process a sequence of M columns of the Gaussian graph state 100 before the first column of the sequence is processed by the one-way quantum computer 440. Thus, the optical delays 414 delay the output streams 406 by M×Δt. This delay is selected based on a desired size of the renormalized graph state 140 and/or logical lattice state 210. Each of the optical delays 414 may be an optical fiber, a folded optical delay line, or another type of optical delay system known in the art.

Figure 5:
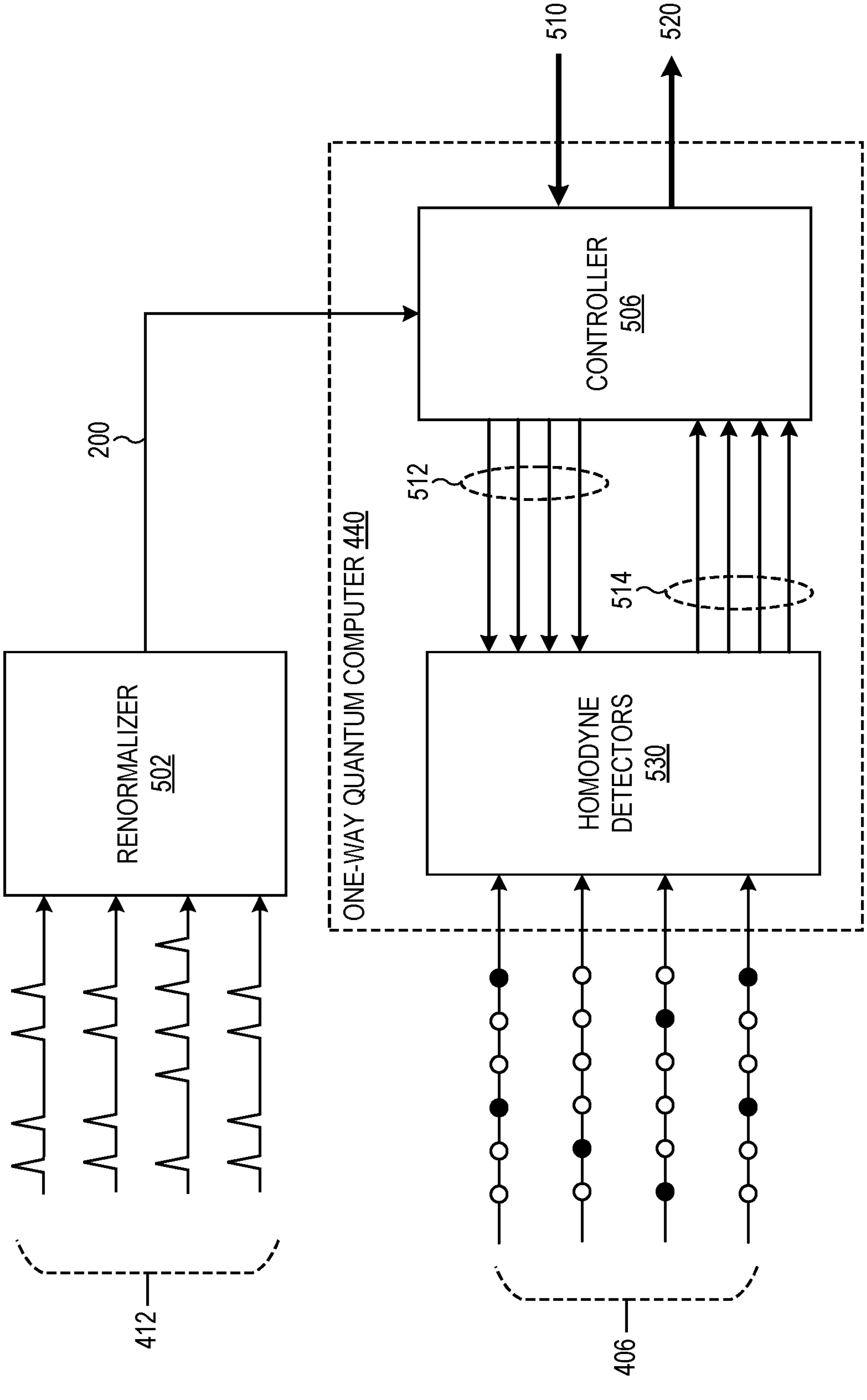
FIG. 5 is a functional diagram illustrating how the one-way quantum computer of FIG. 4 can cooperate with a renormalizer to execute a quantum algorithm with the renormalized graph state, in an embodiment.

FIG. 5 is a functional diagram illustrating how the one-way quantum computer 440 of FIG. 4 can cooperate with a renormalizer 502 to execute a quantum algorithm 510 with the renormalized graph state 140. The renormalizer 502 receives the detector signals 412 from the photon subtractors 408 of FIG. 4, processes the detector signals 412 to construct the graph 200 of the percolated graph state 120, and renormalizes the graph 200 to identify the renormalized graph state 140 (i.e., percolation highways 202 and 204, crossover qubits 206, entanglement chains 208, etc.). The renormalizer 502 outputs the renormalized graph 200 to a controller 506 of the one-way quantum computer 440. The controller 506 returns an output 520 when execution of the quantum algorithm 510 has finished.

The one-way quantum computer 440 also includes homodyne detectors 530 that detect the modes 102 of the output streams 406 (after the optical delay 414, as shown in FIG. 4). Each of the homodyne detectors 530 includes a variable phase shifter (not shown) that may be controlled to detect a qubit in a selected basis. The selected bases are programmed by the controller 506 via control lines 512. Data outputted by the homodyne detectors 530 is communicated back to the controller 506 via data lines 514, where the controller 506 uses the received data to select new bases for the next qubit measurements. The controller 506 also selects the bases according to the renormalized graph 200 so that quantum information only flows along the renormalized graph state 140.

In the examples of FIGS. 4 and 5, the Gaussian graph state 100 is implemented as a two-dimensional cluster state of spatio-temporal modes 102. This cluster state is also known as a time-domain multiplexed cluster state. With this implementation, the Gaussian graph state 100 may be generated from an array of squeezed-light generators, or "squeezers", each outputting a single-mode squeezed-vacuum pulse-train. The outputs of the squeezers are spatially-separated optical beams that may be processed in parallel. The squeezers may be operated synchronously such that all the squeezers output one mode simultaneously. These modes may be entangled to each other using a network of beamsplitters, thereby creating vertical edges in one column 108 of the Gaussian graph state 100. Modes may be further entangled to each other using optical time delays in the network of beamsplitters, thereby creating horizontal edges in the Gaussian graph state 100.

In one embodiment, each squeezer is an optical parametric oscillator (OPO). For example, the time-domain multiplexed Gaussian graph state 100 may be created from four OPOs and a network of five beamsplitters and two optical time delays, as known in the art. In this reference, the Gaussian graph state 100 is encoded onto four optical beams, each coupled into one photon subtractor 408 of FIG. 4. However, the time-domain multiplexed Gaussian graph state 100 may be alternatively created with a different number n of similarly-configured OPOs, wherein the Gaussian graph state 100 is encoded into n optical beams subsequently processed by n corresponding photon subtractors 408. In another embodiment, each of the squeezers is an optical parametric amplifier (OPA). In another embodiment, each of the squeezers is a nano-photonic squeezer. The nano-photonic squeezer may be based on an integrated periodically-poled nonlinear crystal (e.g., PPLN, PPKTP) or on a ring resonator (e.g., using SiN or AlN).

In some embodiments, the array of squeezers is fabricated on a single photonic integrated circuit (PIC). The beamsplitter network and/or optical time delays used to entangle the outputs of the squeezers may also be incorporated on the PIC. The beamsplitters may be variable beamsplitters that can be controlled to correct for manufacturing imperfections and/or implement protocols that engineer the resulting multimode Gaussian cluster state for one-way quantum computing.

In another embodiment, each of the squeezers is powered by a pump laser beam with a controllable pump level (e.g., intensity). The pump levels of the pump laser beams are controlled such that the array of squeezers directly generates the Gaussian cluster state 100, thereby eliminating the need for the beamsplitter network.

In other embodiments, the Gaussian graph state 100 is implemented as a cluster state of entangled frequency modes 102 having the same spatial, temporal, and polarization modes. These frequency modes may be generated, for example, by a quantum optical frequency comb (QOFC), i.e., a single OPO driven by a multifrequency pump and enclosed in an optical cavity forming a comb-like structure of adjacent optical resonances. QOFCs have been used to generate multipartite entanglement of thousands of quantum modes each uniquely identified by the frequency of the corresponding optical resonance. The output of the QOFC is a single optical beam containing pairwise-entangled frequency modes 102 (i.e., frequency-staggered EPR pairs). A subsequent beamsplitter network completes the entanglement between EPR pairs to generate Gaussian graph state 100. To use the QOFC output with the percolator 300, frequency-domain beamsplitters and PNR detectors are needed such that each of the frequency modes 102 can be processed individually. Alternatively, the frequency modes 102 may be spatially separated, for example, with a virtually-imaged phased array, prism, or other type of dispersive optical element.

When the Gaussian graph state 100 is implemented as a cluster state of N entangled frequency modes 102, all N frequency modes 102 may be generated simultaneously. In one embodiment, all N frequency modes 102 are dispersed into spatially-separated beams prior to photon subtraction. In this embodiment, N photon subtractors 408 process N frequency modes 102 simultaneously, wherein each output stream 406 contains only one mode (i.e., either one cat-basis qubit 124 or one untransformed mode 124). In this embodiment, the optical delays 414 are configured with different delays such that some of the resulting cat-basis qubits 124 are processed by the one-way quantum computer 440 prior to other cat-basis qubits 124, thereby allowing the one-way quantum computer 440 to process the cat-basis qubits 124 in a time-multiplexed way.

In one embodiment, all N frequency modes 102 are photon subtracted while remaining in the single beam outputted by the QOFC. In this embodiment, only one photon-subtracting beamsplitter 404 is needed. To identify the success of one-photon subtraction for each of the N frequency modes 102, the first output port of the beamsplitter 404 may be spatially dispersed into N optical beams detected by N corresponding PNR detectors 410. The spatial dispersion may be achieved with a virtually-imaged phased array, prism, or other type of dispersive optical element. The cat-basis qubits 122 and untransformed modes 124 form one output stream 406.

In another embodiment, the Gaussian graph state 100 is implemented as a cluster state of entangled time-frequency modes 102 having the same spatial and polarization modes. In this implementation, each row 106 of the Gaussian graph state 100 corresponds to a single frequency, and the columns 108 correspond to different times. Time-frequency modes 102 may be generated from a QOFC by operating the QOFC in pulsed mode, and different temporal modes may be entangled using a beamsplitter network with optical delays (thereby generating horizontal edges in the Gaussian graph state 100, as depicted in FIG. 1). In this implementation, the one-way quantum computer 440 processes the modes 102 at different times (i.e., one column at a time), thereby operating in a time-multiplexed way without varying optical time delays.

In one embodiment, the QOFC is powered by a multi-frequency pump laser beam where each frequency component has a controllable pump level (e.g., intensity). The pump levels are controlled such that the QOFC directly generates the Gaussian cluster state 100, thereby eliminating the need for any beamsplitter network after the QOFC.

METHOD EMBODIMENTS

Figure 6:
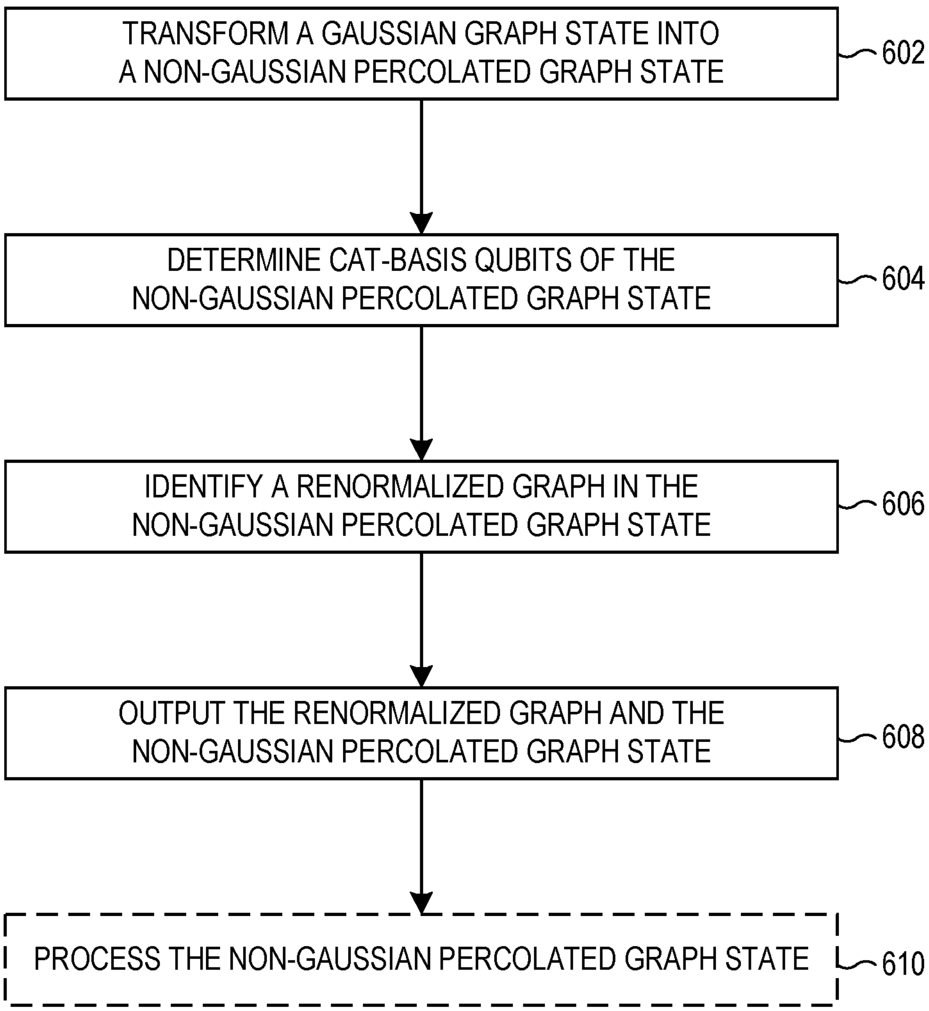
FIG. 6 is a flow chart of a cluster-state quantum computing method 600.

FIG. 6 is a flow chart of a cluster-state quantum computing method 600. In the block 602, a Gaussian graph state is transformed into a non-Gaussian percolated graph state by probabilistically subtracting one photon from each of a plurality of modes forming the Gaussian graph state. In one example of the block 602, FIG. 1 shows how the Gaussian graph state 100 may be transformed into the non-Gaussian percolated graph state 120 via photon subtraction 110 of modes 102. In another example of the block 602, the percolator 400 of FIG. 4 uses the array of photon subtractors 408 to transform the Gaussian graph state 100 into the non-Gaussian percolated graph state 120.

In the block 604 of the method 600, cat-basis qubits of the non-Gaussian percolated graph state are determined for which one photon was successfully subtracted from a corresponding one of the modes. In one example of the block 604, photon subtraction 110 probabilistically transforms the modes 102 into cat-basis qubits 122, as shown in FIG. 1. In another example of the block 604, The renormalizer 502 of FIG. 4 receives the detector signals 412 from the photon subtractors 408 of FIG. 4 and processes the detector signals 412 to construct the graph 200 of the percolated graph state 120.

In the block 606 of the method 600, a renormalized graph of logical qubits connected by percolation highways is identified in the non-Gaussian percolated graph state. The logical qubits and percolation highways are formed from the cat-basis qubits. In one example of the block 606, FIG. 2 shows the renormalized graph 200 identifying connected qubits 142 that form vertical percolation highways 202, horizontal percolation highways 204, and crossover qubits 206. In another example of the block 606, the renormalizer 502 of FIG. 5 renormalizes the graph 200 to identify the renormalized graph state 140.

In the block 608 of the method 600, the renormalized graph and the non-Gaussian percolated graph state are outputted to a one-way quantum computer. In one example of the block 608, the one-way quantum computer 440 of FIG. 4 processes the output streams 406. In another example of the block 608, the renormalizer 502 outputs the renormalized graph 200 to a controller 506 of the one-way quantum computer 440.

In some embodiments, the method 600 includes the block 610, in which the one-way quantum computer processes the non-Gaussian percolated graph state according to the renormalized graph to implement a quantum computing algorithm. In one example of the block 610, the one-way quantum computer 440 of FIG. 4 returns the output 520 when execution of the quantum algorithm 510 has finished.

Combination of Features

Features described above as well as those claimed below may be combined in various ways without departing from the scope hereof. The following examples illustrate possible, non-limiting combinations of features and embodiments described above. It should be clear that other changes and modifications may be made to the present embodiments without departing from the spirit and scope of this invention:

(A1) A cluster-state quantum computing method may include transforming a Gaussian graph state into a non-Gaussian percolated graph state by probabilistically subtracting one photon from each of a plurality of modes forming the Gaussian graph state. The method may also include determining cat-basis qubits of the non-Gaussian percolated graph state for which one photon was successfully subtracted from a corresponding one of the modes, and identifying in the non-Gaussian percolated graph state a renormalized graph of logical qubits connected by percolation highways. The logical qubits and percolation highways may be formed from the cat-basis qubits. The method may also include outputting the renormalized graph and the non-Gaussian percolated graph state to a one-way quantum computer.

(A2) In the method denoted (A1), the cluster-state quantum computing method may include processing, with the one-way quantum computer, the non-Gaussian percolated graph state according to the renormalized graph to implement a quantum computing algorithm.

(A3) In either of the methods denoted (A1) and (A2), said identifying may include locating connected qubits, of the cat-basis qubits, that form the percolation highways in the non-Gaussian percolated graph state, forming the logical qubits from at least some of the connected qubits, and forming, from the percolation highways, entanglement chains that link the logical qubits.

(A4) In any one of the methods denoted (A1) to (A3), said transforming the Gaussian graph state into the non-Gaussian percolated graph state may include parallelly processing a plurality of spatially-separated registers that form the Gaussian graph state.

(A5) In the method denoted (A4), the cluster-state quantum computing method may include, for each of the registers, subtracting one photon from each mode of the Gaussian graph state by: (i) entangling said each mode with a vacuum state by coupling said each mode to a first input port of a beamsplitter and coupling the vacuum state to a second input port of the beamsplitter, and (ii) measuring, with a photodetector at a first output port of the beamsplitter, the one photon when successfully subtracted from said each mode. Said determining the cat-basis qubits may include labeling said each mode as one of the cat-basis qubits based on an output of the photodetector.

(A6) In any one of the methods denoted (A1) to (A5), the cluster-state quantum computing method may include creating the Gaussian graph state by generating a multimode squeezed vacuum state that forms the plurality of modes.

(A7) In the method denoted (A6), said generating the multimode squeezed vacuum state may use a quantum optical frequency comb. Each of the plurality of modes may correspond to one of a plurality of frequencies of the quantum optical frequency comb.

(A8) In the method denoted (A7), the cluster-state quantum computing method may include dispersing the multimode squeezed vacuum state to spatially separate the plurality of modes.

(B1) A cluster-state quantum computing system may include an array of photon subtractors configured to transform a Gaussian graph state into a non-Gaussian percolated graph state by probabilistically subtracting one photon from each of a corresponding plurality of modes forming the Gaussian graph state. Each of the photon subtractors may include a single-photon detector configured to output a detector signal. The system may also include a renormalizer configured to process the detector signal outputted by each single-photon detector to determine cat-basis qubits of the non-Gaussian percolated graph state for which one photon was successfully subtracted from a corresponding one of the modes. The renormalizer may also be configured to identify in the non-Gaussian percolated graph state a renormalized graph of logical qubits connected by percolation highways, wherein the logical qubits and percolation highways are formed from the cat-basis qubits. The renormalizer may also be configured to output the renormalized graph and the non-Gaussian percolated graph state to a one-way quantum computer.

(B2) In the system denoted (B1), the cluster-state quantum computing system may include the one-way quantum computer. The one-way quantum computer may be configured to process the non-Gaussian percolated graph state according to the renormalized graph to implement a quantum computing algorithm.

(B3) In the system denoted (B2), the one-way quantum computer may include an array of homodyne detectors configured to detect the modes.

(B4) In any one of the systems denoted (B1) to (B3), the renormalizer may be configured to identify the renormalized graph by (i) locating connected qubits, of the cat-basis qubits, that form the percolation highways in the non-Gaussian percolated graph state, (ii) forming the logical qubits from at least some of the connected qubits, and (iii) forming, from the percolation highways, entanglement chains that link the logical qubits.

(B4) In any one of the systems denoted (B1) to (B4), the renormalizer may be configured to transform the Gaussian graph state into the non-Gaussian percolated graph state by parallelly processing, with the array of photon subtractors, a corresponding array of spatially-separated registers that form the Gaussian graph state.

(B5) In the system denoted (B4), each of the photon subtractors may include a beamsplitter configured to entangle the corresponding mode with a vacuum state by coupling the corresponding mode to a first input port of the beamsplitter and coupling the vacuum state to a second input port of the beamsplitter.

(B6) In either one of the systems denoted (B4) and (B5), the cluster-state quantum computing system may include an optical delay for each of the spatially-separated registers.

(B7) In any one of the systems denoted (B4) to (B6), the cluster-state quantum computing system may include an array of squeezed-light generators, wherein each of the squeezed-light generators outputs a single-mode squeezed-vacuum pulse-train into a corresponding one of the array of photon subtractors.

(B8) In the system denoted (B7), each of the squeezed-light generators may be an optical parametric oscillator.

(B9) In either one of the systems denoted (B7) and (B8), the array of squeezed-light generators may be configured to operate synchronously.

(B10) In any one of the systems denoted (B7) to (B9), the cluster-state quantum computing system may include a network of beamsplitters configured to entangle the single-mode squeezed-vacuum pulse-train outputted by each of the squeezed-light generators.

(B11) In any one of the systems denoted (B1) to (B9), the cluster-state quantum computing system may include a quantum optical frequency comb configured to generate a multimode squeezed vacuum state that forms the plurality of modes of the Gaussian graph state.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A cluster-state quantum computing method, comprising:

transforming a Gaussian graph state into a non-Gaussian percolated graph state by probabilistically subtracting one photon from each of a plurality of modes forming the Gaussian graph state;

determining cat-basis qubits of the non-Gaussian percolated graph state for which one photon was successfully subtracted from a corresponding one of the modes;

identifying in the non-Gaussian percolated graph state a renormalized graph of logical qubits connected by percolation highways, the logical qubits and percolation highways being formed from the cat-basis qubits; and outputting the renormalized graph and the non-Gaussian percolated graph state to a one-way quantum computer.

2. The cluster-state quantum computing method of claim 1, further comprising processing, with the one-way quantum computer, the non-Gaussian percolated graph state according to the renormalized graph to implement a quantum computing algorithm.

3. The cluster-state quantum computing method of claim 1, wherein said identifying includes:

locating connected qubits, of the cat-basis qubits, that form the percolation highways in the non-Gaussian percolated graph state;

forming the logical qubits from at least some of the connected qubits; and forming, from the percolation highways, entanglement chains that link the logical qubits.

4. The cluster-state quantum computing method of claim 1, wherein said transforming the Gaussian graph state into the non-Gaussian percolated graph state includes parallelly processing a plurality of spatially-separated registers that form the Gaussian graph state.

5. The cluster-state quantum computing method of claim 4, further comprising, for each of the registers, subtracting one photon from each mode of the Gaussian graph state by:

entangling said each mode with a vacuum state by coupling said each mode to a first input port of a beamsplitter and coupling the vacuum state to a second input port of the beamsplitter; and measuring, with a photodetector at a first output port of the beamsplitter, the one photon when successfully subtracted from said each mode;

wherein said determining the cat-basis qubits includes labeling said each mode as one of the cat-basis qubits based on an output of the photodetector.

6. The cluster-state quantum computing method of claim 1, further comprising creating the Gaussian graph state by generating a multimode squeezed vacuum state that forms the plurality of modes.

7. The cluster-state quantum computing method of claim 6, wherein said generating the multimode squeezed vacuum state uses a quantum optical frequency comb, each of the plurality of modes corresponding to one of a plurality of frequencies of the quantum optical frequency comb.

8. The cluster-state quantum computing method of claim 7, further comprising dispersing the multimode squeezed vacuum state to spatially separate the plurality of modes.

9. A cluster-state quantum computing system, comprising:

an array of photon subtractors configured to transform a Gaussian graph state into a non-Gaussian percolated graph state by probabilistically subtracting one photon from each of a corresponding plurality of modes forming the Gaussian graph state, wherein each of the photon subtractors includes a single-photon detector configured to output a detector signal; and a renormalizer configured to:

process the detector signal outputted by each single-photon detector to determine cat-basis qubits of the non-Gaussian percolated graph state for which one photon was successfully subtracted from a corresponding one of the modes;

identify in the non-Gaussian percolated graph state a renormalized graph of logical qubits connected by percolation highways, wherein the logical qubits and percolation highways are formed from the cat-basis qubits; and output the renormalized graph and the non-Gaussian percolated graph state to a one-way quantum computer.

10. The cluster-state quantum-computing system of claim 9, further comprising the one-way quantum computer;

wherein the one-way quantum computer is configured to process the non-Gaussian percolated graph state according to the renormalized graph to implement a quantum computing algorithm.

11. The cluster-state quantum-computing system of claim 10, wherein the one-way quantum computer includes an array of homodyne detectors configured to detect the modes.

12. The cluster-state quantum-computing system of claim 9, wherein the renormalizer is configured to identify the renormalized graph by:

locating connected qubits, of the cat-basis qubits, that form the percolation highways in the non-Gaussian percolated graph state;

forming the logical qubits from at least some of the connected qubits; and forming, from the percolation highways, entanglement chains that link the logical qubits.

13. The cluster-state quantum-computing system of claim 9, wherein the renormalizer is configured to transform the Gaussian graph state into the non-Gaussian percolated graph state by parallelly processing, with the array of photon subtractors, a corresponding array of spatially-separated registers that form the Gaussian graph state.

14. The cluster-state quantum-computing system of claim 13, wherein each of the photon subtractors includes a beamsplitter configured to entangle the corresponding mode with a vacuum state by coupling the corresponding mode to a first input port of the beamsplitter and coupling the vacuum state to a second input port of the beamsplitter.

15. The cluster-state quantum-computing system of claim 13, further comprising an optical delay for each of the spatially-separated registers.

16. The cluster-state quantum-computing system of claim 13, further comprising an array of squeezed-light generators, wherein each of the squeezed-light generators outputs a single-mode squeezed-vacuum pulse-train into a corresponding one of the array of photon subtractors.

17. The cluster-state quantum-computing system of claim 16, wherein each of the squeezed-light generators is an optical parametric oscillator.

18. The cluster-state quantum-computing system of claim 16, wherein the array of squeezed-light generators is configured to operate synchronously.

19. The cluster-state quantum-computing system of claim 16, further comprising a network of beamsplitters configured to entangle the single-mode squeezed-vacuum pulse-train outputted by each of the squeezed-light generators.

20. The cluster-state quantum-computing system of claim 9, further comprising a quantum optical frequency comb configured to generate a multimode squeezed vacuum state that forms the plurality of modes of the Gaussian graph state.

* * * * *